(12) United States Patent
Inaba et al.

(10) Patent No.: US 10,372,969 B2
(45) Date of Patent: Aug. 6, 2019

(54) INFORMATION PROCESSING APPARATUS, OBJECT RECOGNITION APPARATUS, METHOD OF CONTROLLING INFORMATION PROCESSING APPARATUS, AND STORAGE MEDIUM

(71) Applicant: CANON KABUSHIKI KAISHA, Tokyo (JP)

(72) Inventors: Masaki Inaba, Tokyo (JP); Masahiro Suzuki, Kawasaki (JP); Kazuhiko Kobayashi, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/678,659

(22) Filed: Aug. 16, 2017

(65) Prior Publication Data

US 2018/0082106 A1 Mar. 22, 2018

(30) Foreign Application Priority Data

Sep. 16, 2016 (JP) .................................. 2016-181937

(51) Int. Cl.
*G06K 9/00* (2006.01)
*G06T 7/55* (2017.01)
*G06K 9/62* (2006.01)

(52) U.S. Cl.
CPC ....... *G06K 9/00214* (2013.01); *G06K 9/6256* (2013.01); *G06T 7/55* (2017.01); G06K 2209/09 (2013.01); G06K 2209/21 (2013.01); G06T 2207/10028 (2013.01); G06T 2207/20081 (2013.01); G06T 2207/20092 (2013.01)

(58) Field of Classification Search
CPC . G06T 2207/20081; G06T 2207/10028; G06T 7/55; G06T 2207/20092; G06K 2209/21; G06K 9/00214; G06K 2209/09; G06K 9/6256
USPC ....................................................... 382/103
See application file for complete search history.

(56) References Cited

FOREIGN PATENT DOCUMENTS

JP 4291757 B2 * 7/2009 ............... G06T 7/00

* cited by examiner

*Primary Examiner* — Gregory F Cunningham
(74) *Attorney, Agent, or Firm* — Rossi, Kimms & McDowell LLP

(57) ABSTRACT

An information processing apparatus comprises an image generation unit configured to generate, based on a first image in which a transparent object having transparency is captured and a second image in which a target object is captured, a reproduced image in which the target object which is at least partially covered by the transparent object is reproduced; and a creation unit configured to create, based on the reproduced image, a model for recognizing the target object which is at least partially covered by the transparent object.

12 Claims, 12 Drawing Sheets

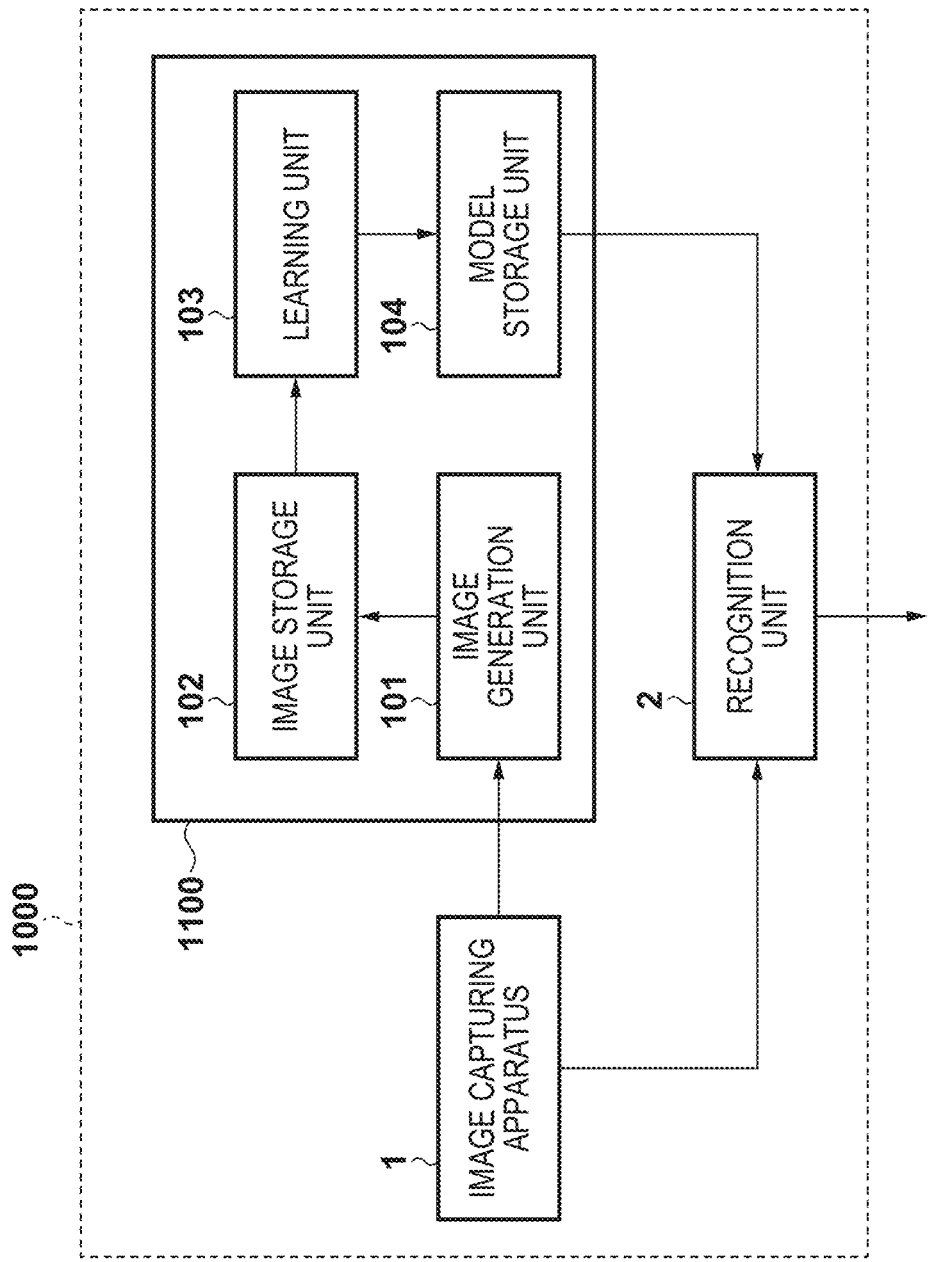

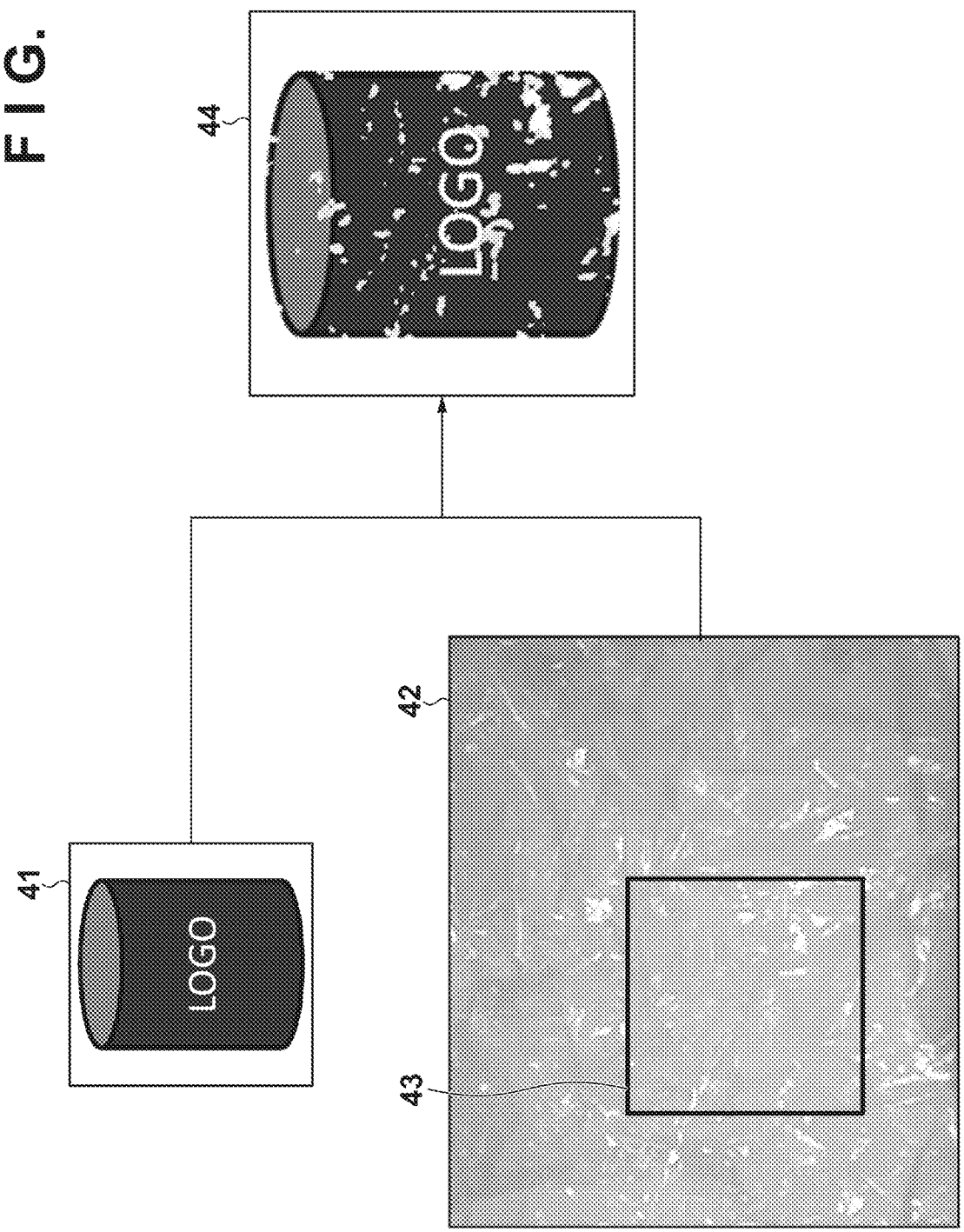

INFORMATION PROCESSING APPARATUS, OBJECT RECOGNITION APPARATUS, METHOD OF CONTROLLING INFORMATION PROCESSING APPARATUS, AND STORAGE MEDIUM

BACKGROUND OF THE INVENTION

Field of the Invention

The present invention relates to an information processing apparatus, an object recognition apparatus, a method of controlling an information processing apparatus, and a storage medium.

Description of the Related Art

Conventionally, a method for learning a feature or a pattern and for recognizing a target object from a depth image or an image in which the target object is captured is known. However, in conventional methods, there is a problem in that a recognition rate falls in a case where there is a large difference between an image prepared in advance and an image desired to be actually recognized. For example, images greatly differ from each other in such cases in which a part of the target object is concealed by other objects, a surface of a target object reflects specularly causing saturation to occur, and the like.

In contrast to this, a method for reproducing a state in which a target object is concealed by providing a plurality of appropriate masks to an image prepared in advance is proposed in Japanese Patent No. 4291757. A recognition method that is robust with respect to a concealed target object is realized by learning features and patterns from a plurality of images in which a concealed target object is reproduced.

However, there are a huge number of variations of an appearance of a packaged object in a case where an object (packaged object) wrapped in a transparent packaging member (such as transparent vinyl or bubble wrap) or an object covered in a packaging member is the target object. This is because packaging members are often non-rigid bodies whose shape changes and on whose surface specular reflections can easily occur, and thereby the appearance of the target object changes depending on color of the packaging member. For this reason, there is a problem in that image recognition is still difficult if only masking of a region of a part of the target object is performed as in Japanese Patent No. 4291757.

Also, although a method of capturing a large number of various patterns of appearances (images) of a packaged object by varying the orientation of the target object or the shape of the packaging member can be considered, there is a problem in that it is cumbersome to capture such images.

The present invention is conceived in view of the above-described problems, and provides a technique for reducing the effort in obtaining images (learning data) of an object that is covered by a transparent object.

SUMMARY OF THE INVENTION

According to one aspect of the present invention, there is provided an information processing apparatus comprising: an image generation unit configured to generate, based on a first image in which a transparent object having transparency is captured and a second image in which a target object is captured, a reproduced image in which the target object which is at least partially covered by the transparent object is reproduced; and a creation unit configured to create, based on the reproduced image, a model for recognizing the target object which is at least partially covered by the transparent object.

Further features of the present invention will become apparent from the following description of exemplary embodiments with reference to the attached drawings.

BRIEF DESCRIPTION OF THE DRAWINGS

FIG. 1 is a block diagram illustrating an example of a configuration of an information processing apparatus of a first embodiment.

FIG. 3 is a view for describing processing of an image generation unit of the first embodiment.

DESCRIPTION OF THE EMBODIMENTS

Figure 2A:
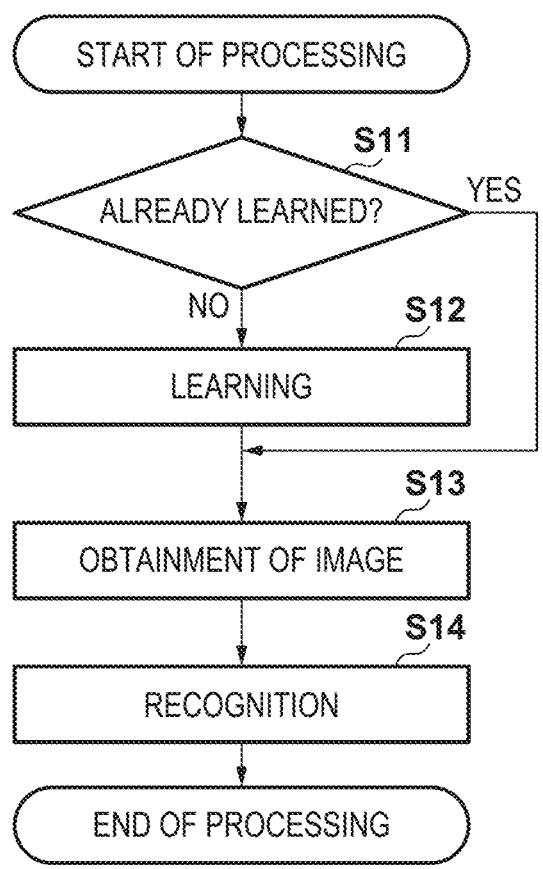
FIG. 2A-FIG. 2B are flowcharts for describing processing by the information processing apparatus of the first embodiment.

An exemplary embodiment(s) of the present invention will now be described in detail with reference to the drawings. It should be noted that the relative arrangement of the components, the numerical expressions and numerical values set forth in these embodiments do not limit the scope of the present invention unless it is specifically stated otherwise.

(First Embodiment)

An information processing apparatus described in the first embodiment is an object recognition apparatus for recognizing an object by generating an image (hereinafter referred to as a reproduced image) in which an appearance (outer appearance) of a packaged object is reproduced from an image of a target object and an image of a packaging member, and learning, by a CNN (Convolution Neural Network) which is a type of network used in deep learning, a feature or pattern from the generated reproduced image. A useful feature or pattern can be learned for recognition because the reproduced image is similar to an appearance (outer appearance) of an actual packaged object. Also, effort in capturing images is reduced because various patterns of appearances can be generated by image processing. As a result, recognition of an object wrapped in a packaging member can be realized at a lower cost.

[Apparatus Configuration]

An example of an object recognition apparatus 1000 equipped with an information processing apparatus 1100 of the first embodiment is illustrated by the block diagram of FIG. 1. The object recognition apparatus 1000 is equipped with an image capturing apparatus 1, a recognition unit 2, and the information processing apparatus 1100.

The image capturing apparatus 1 is an apparatus that obtains a color (RGB) image of an image capturing target. The image capturing target, at a time of recognition, is a target object (packaged object) wrapped in a packaging member, and at a time of learning, is the target object not wrapped in the packaging member and the packaging member not wrapping the target object. The captured image is sent to the recognition unit 2 in order to recognize a target object within the image or is sent to the information processing apparatus 1100 in order to learn a CNN model used for recognition. The recognition unit 2, by inputting an image sent from the image capturing apparatus 1 to a CNN model stored in the information processing apparatus 1100, recognizes whether or not the target object is included within the image.

The information processing apparatus 1100 is equipped with an image generation unit 101, an image storage unit 102, a learning unit 103, and a model storage unit 104. The image generation unit 101 obtains the image of the target object and the image of the packaging member from the image capturing apparatus 1, and then generates a reproduced image of the packaged object from these images. Then, it stores the generated reproduced image to the image storage unit 102.

The image storage unit 102 stores the reproduced image generated by the image generation unit 101. The learning unit 103 creates and learns a CNN model by using reproduced images stored in the image storage unit 102. Then, it stores the learned CNN model to the model storage unit 104. The model storage unit 104 stores information of the CNN model created by the learning unit 103.

[Recognition Processing]

Next, a procedure of recognition processing by the object recognition apparatus 1000 according to a first embodiment is described with reference to a flowchart of FIG. 2A.

(Step S11)

In step S11, the object recognition apparatus 1000 checks whether or not a CNN model is stored in the information processing apparatus 1100 and determines whether or not the CNN model has already been learned. In a case where the CNN model has already been learned, the CNN model is read from the information processing apparatus 1100, and step S13 is transitioned to. In a case where the CNN model has not already been learned, step S12 is transitioned to.

(Step S12)

In step S12, the information processing apparatus 1100 performs learning of a CNN model. Details are described later.

(Step S13)

In step S13, the image capturing apparatus 1 captures an image in which a target object or the like appears and sends the image to the recognition unit 2.

(Step S14)

In step S14, the recognition unit 2 inputs the image sent from the image capturing apparatus 1, and obtains a binary value indicating whether or not the target object appears within the image by performing an arithmetic operation of the already learned CNN model. Then, it is decided whether or not the target object appears within the image according to the obtained binary value. Then, a recognition result is outputted and the processing ends.

[Learning Processing]

Figure 2B:
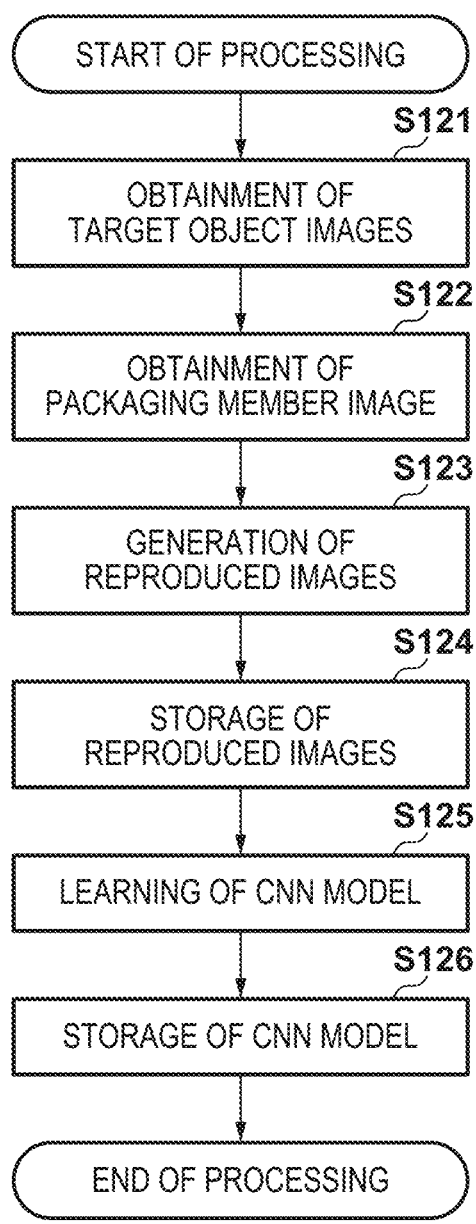

Next, a procedure of learning processing by the information processing apparatus 1100 according to a first embodiment is described with reference to a flowchart of FIG. 2B.

(Step S121)

In step S121, the information processing apparatus 1100 obtains images of the target object captured by the image capturing apparatus 1. Prior to this, the image capturing apparatus 1 captures the images of the target object not wrapped in a packaging member. At this time, in order to be recognizable from various directions, various changes to the relative position and orientation between the image capturing apparatus 1 and the target object are made and images are obtained for each of the orientations. For example, the image capturing apparatus 1 may perform respective captures after moving by a robot to positions sampled at regular intervals on a spherical surface centered on the target object. The image capturing apparatus 1 sends the captured images to the image generation unit 101.

(Step S122)

In step S122, the information processing apparatus 1100 obtains an image of the packaging member captured by the image capturing apparatus 1. Prior to this, the image capturing apparatus 1 captures the image of the packaging member. At this time, the same packaging member that will actually be used for packaging is spread out and captured in order to obtain a packaging member image having a variety of appearances. It is desirable to spread out the packaging member in a state close to that of the packaging of the packaged object. In other words, the packaging member to be captured may be stretched and spread out in a case where the packaging member is cleanly stretched in the packaging, and the packaging member to be captured may also be spread out such that wrinkles remain to a certain extent in a case where wrinkles will remain on the packaging member in the packaging. Also, it is desirable to make a background white in order to reduce an influence of the color of the background at the time of capturing. For example, an image such as reference numeral 42 of FIG. 3 is obtained when a transparent vinyl bag is spread out and captured. Within this image, a variety of textures (appearances) that appear due to shape distortion of a transparent vinyl bag and the light source environment of surroundings are included. The image capturing apparatus 1 sends the captured image to the image generation unit 101.

(Step S123)

In step S123, the image generation unit 101 generates reproduced images of the packaged object based on the image of the packaging member and each of the images of the target object sent from the image capturing apparatus 1. A partial image extracted from the image of the packaging member is superimposed on each of the images of the target object captured in the various orientations to produce the reproduced images. Hereinafter, a process by which a reproduced image is generated is described by using FIG. 3. In FIG. 3, reference numeral 41 represents an image of a target object of a certain orientation, the reference numeral 42 represents the image of a packaging member, reference numeral 43 represents an extraction region, and reference numeral 44 represents a generated reproduced image.

Firstly, the position of the extraction region 43 is decided at random from the image 42 of the packaging member, and an image C which is a part extracted from the image 42 of the packaging member is obtained. The size of the extraction region 43 may be made to be large enough that the target object fits therein. Then, the obtained image C is superimposed on the image I of the target object. When the reproduced image is represented by R, the reproduced image is generated based on the following equation.

[EQUATION 1]

$$R(x, y) = \begin{cases} \alpha C(x, y) + (1-\alpha)I(x, y), & C(x, y) < t \\ C(x, y), & C(x, y) \geq t \end{cases} \quad (1)$$

Here, x and y represent pixel positions within the image, α represents a coefficient when alpha blending between the image C of the packaging member and an image I of the target object is performed, and t represents a threshold for determining whether or not saturation (specular reflection) is occurring. Specifically, the reproduced image is generated by, for a pixel whose luminance value is greater than or equal to the threshold, making the luminance value of the pixel be the luminance value of the reproduced image. Because the target object will become invisible in a case where light on the surface of the packaging member is specularly reflected, composition processing is separated according to whether or not the light is specularly reflected. By performing such an image composition, a concealment of the target object by a specular reflection of the surface of the packaging member or a change in color of the target object due to a color of the packaging member is represented, and a reproduced image such as reference numeral 44 is generated. It is possible to generate a plurality of patterns of reproduced images of the packaged object by compositing while randomly changing the position of the extraction region 43.

It is possible to generate a large number of reproduced images of the packaged object by performing a sequence of composition processes with respect to each orientation of the target object image. The image generation unit 101 sends the generated reproduced images to the image storage unit 102.

(Step S124)

In step S124, the image storage unit 102 stores the reproduced images generated by the image generation unit 101 within a memory.

(Step S125)

In step S125, the learning unit 103 creates and learns a CNN model (creation of a model) by using the reproduced images stored in the image storage unit 102. In the present embodiment, the creation and the learning of the model is referred to as obtaining CNN model parameters. Regarding the design of the CNN model, an RGB three-dimensional image of the reproduced images is taken as input, three convolution layers and two fully-connected layers are used, and the output is a model for discrimination of two classes corresponding to whether or not the input is a target object, for example.

The learning of the CNN model takes, as learning data input, data that labels a reproduced image True and labels an image that is not the target object False, and optimizes a backpropagation used commonly in deep learning. For an image that is not the target object, an image uploaded to the Web may be used for example. The learning unit 103 sends the CNN model that is learned in this way to the model storage unit 104.

(Step S126)

In step S126, the model storage unit 104 stores information of the CNN model learned in the learning unit 103 within the memory, and the processing is ended.

As described above, by virtue of the present embodiment, reproduced images of a packaged object can be generated from images of a target object and an image of a packaging member, and by learning a CNN model from the reproduced images, a packaged object can be recognized without requiring the effort of capturing a large number of images of packaged objects.

[Variation of First Embodiment]

Although variation (multiformity) of appearance is obtained by spreading out and then capturing the packaging member in step S122, limitation to this is not required. A plurality of images may be captured while each time causing the shape of the packaging member to change, and a plurality of images may be captured while each time causing a light source environment of the surroundings to change.

Although the reproduced image is generated based on Equation 1 in step S123, a composition method is not limited to this. For example, the reproduced image may be generated by a product as in Equation 2, and additionally, an image A of a background against which the target object or the packaging member is placed may be captured, and a division by the background color may be performed for normalization as in Equation 3. Also, it may not be necessary for the entire packaging member to be transparent, and there may be some regions that are not transparent. For a non-transparent region, a luminance value C(x,y) of the image of the packaging member may be set to be the luminance value R(x,y) of the reproduced image.

[EQUATION 2]

$$R(x, y) = \begin{cases} C(x, y) \times I(x, y), & C(x, y) < t \\ C(x, y), & C(x, y) \geq t \end{cases} \quad (2)$$

[EQUATION 3]

$$R = \begin{cases} \dfrac{C(x, y) \times I(x, y)}{A(x, y)}, & C(x, y) < t \\ C(x, y), & C(x, y) \geq t \end{cases} \quad (3)$$

Additionally, in a case where there is CAD data of the target object whose reflectance is determined, the reproduced image may be generated by setting a virtual surface on which the packaging member is reproduced around the target object from the actual transparency and color of the packaging member (a transparent object having a transparency) and then performing CG rendering. At this time, the CG rendering may be performed after setting a virtual light source environment that reproduces an actual light source environment obtained by a zenith camera or the like.

(Second Embodiment)

An information processing apparatus described in the second embodiment is an object recognition apparatus for recognizing an object by learning, by a CNN model, a feature or a pattern from a generated reproduced image, similarly to the first embodiment. However, the second embodiment differs in that it further includes an image determination unit for determining whether or not there is sufficient variation (multiformity) within an image of the captured packaging member for recognition. It is possible to further reduce the effort of capturing because it can be understood how many images of the packaging member it is sufficient to obtain. As a result, recognition of an object wrapped in a packaging member can be realized at a lower cost.

[Apparatus Configuration]

Figure 4:
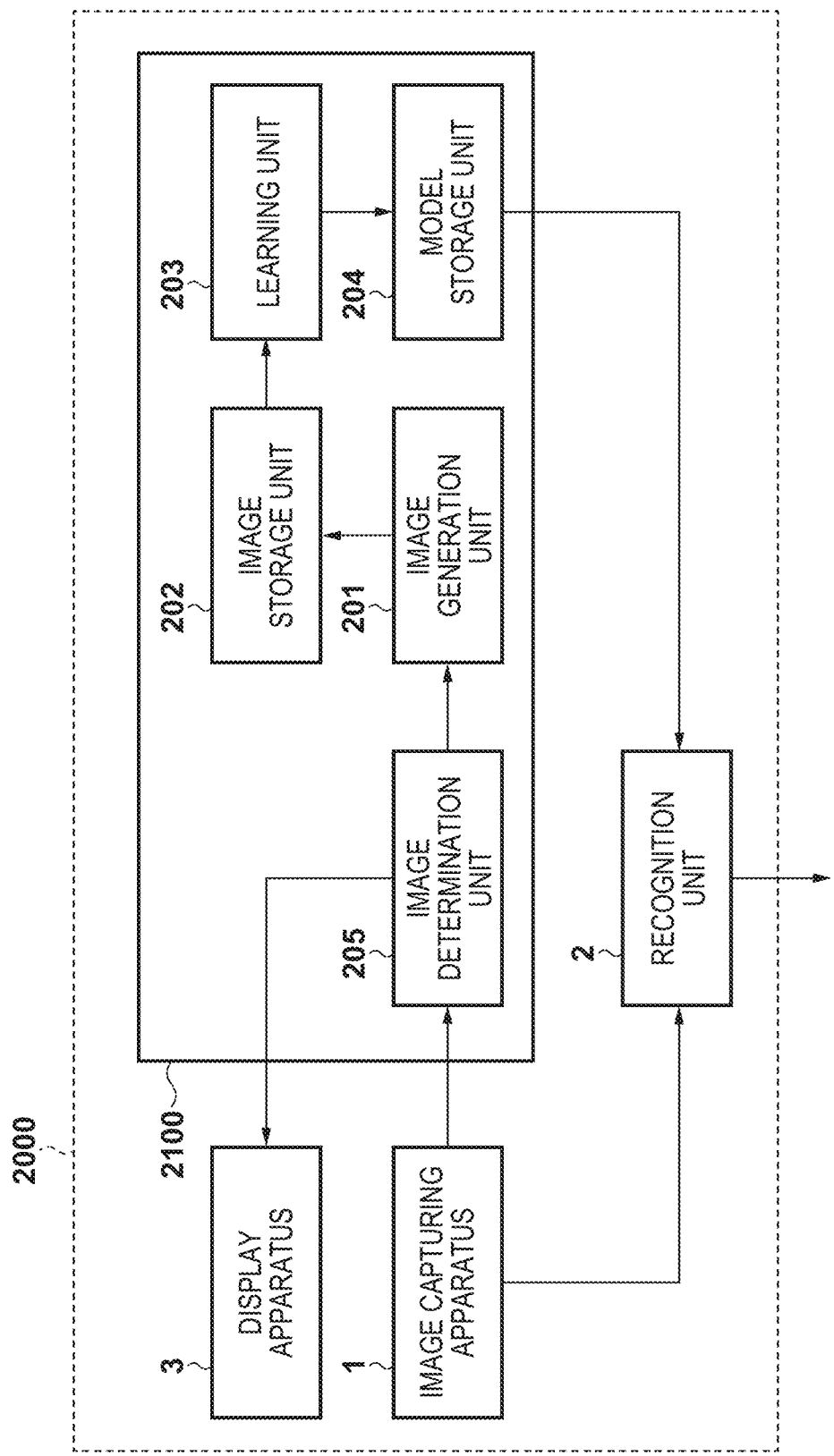
FIG. 4 is a block diagram illustrating an example of a configuration of an information processing apparatus of a second embodiment.

An example of an object recognition apparatus 2000 equipped with an information processing apparatus 2100 of the second embodiment is illustrated by the block diagram of FIG. 4.

The object recognition apparatus 2000 is equipped with the image capturing apparatus 1, the recognition unit 2, a display apparatus 3, and the information processing apparatus 2100. Note, because the image capturing apparatus 1 and the recognition unit 2 are substantially the same as those in the first embodiment, description thereof is omitted. The display apparatus 3 displays information such as text sent from the information processing apparatus 2100.

The information processing apparatus 2100 is equipped with an image generation unit 201, an image storage unit 202, a learning unit 203, a model storage unit 204, and an image determination unit 205. Note, because the image generation unit 201, the image storage unit 202, the learning unit 203, and the model storage unit 204 are substantially the same as the image generation unit 101, the image storage unit 102, the learning unit 103, and the model storage unit 104 of the first embodiment, description thereof is omitted.

The image determination unit 205 receives images of the target object and an image of the packaging member captured by the image capturing apparatus 1, and determines whether or not there is sufficient variation (multiformity) within the images of the packaging member for recognition. Information indicating that the image is sent to the image generation unit 201 when this is the case and that it is necessary to capture an additional packaging member when this is not the case is caused to be displayed on the display apparatus 3.

[Recognition Processing]

Because recognition processing by the object recognition apparatus 2000 of the second embodiment is substantially the same as the recognition processing of the first embodiment (FIG. 2A), description thereof is omitted.

Figure 5:
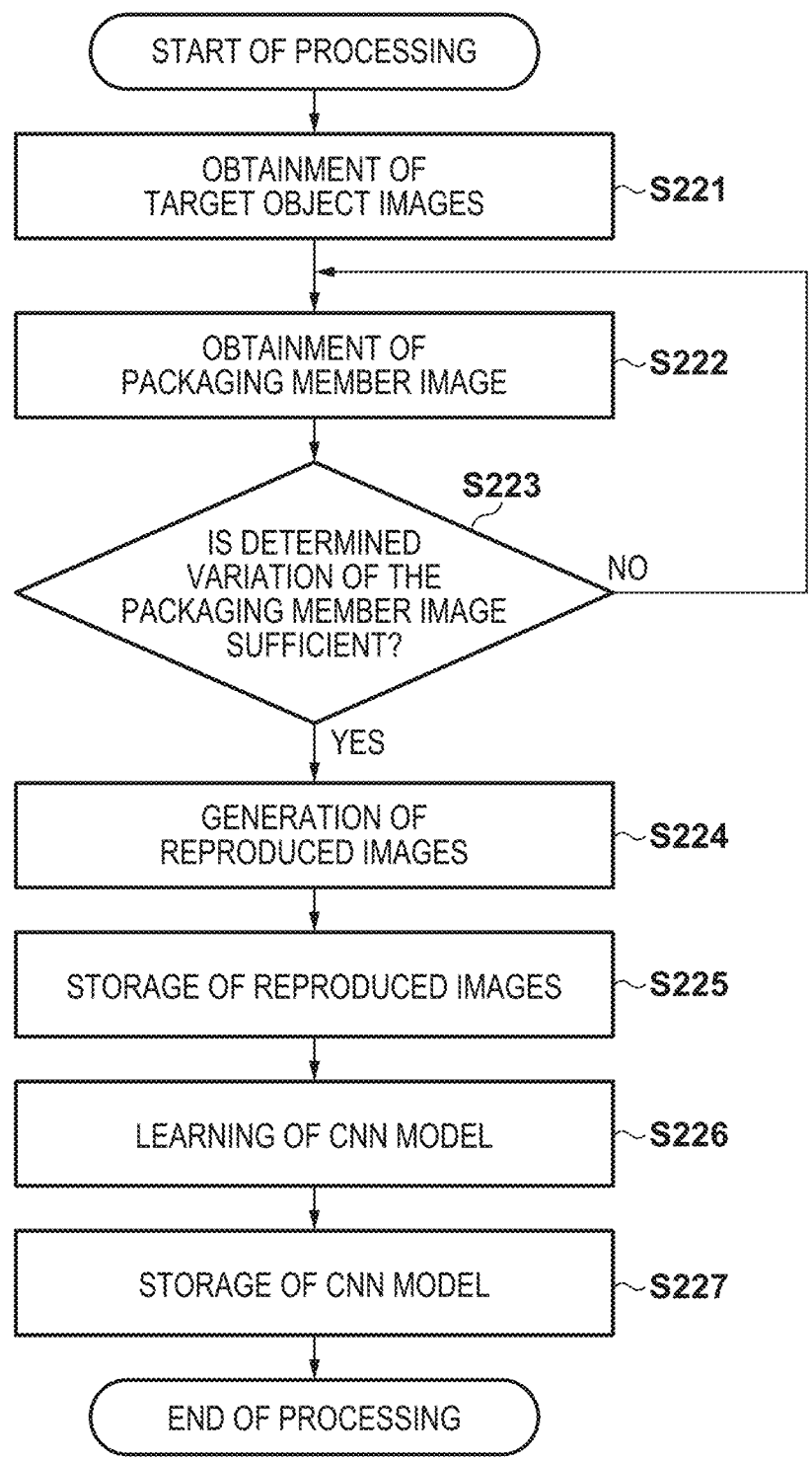
FIG. 5 is a flowchart for describing processing by the information processing apparatus of the second embodiment.

Next, a procedure of learning processing by the information processing apparatus 2100 according to a second embodiment is described with reference to a flowchart of FIG. 5. Note, because step S221, step S225, step S226, and step S227 are substantially respectively the same as step S121, step S124, step S125, and step S126 of the first embodiment, description thereof is omitted.

(Step S222)

In step S222, the information processing apparatus 1100 obtains an image of the packaging member captured by the image capturing apparatus 1. Prior to this, the image capturing apparatus 1 captures the image of the packaging member and sends the captured image to the image determination unit 205 similarly to step S122 of the first embodiment. Also, an image of the packaging member is recaptured and the captured image is sent to the image determination unit 205 each time a request for an additional capture comes from the image determination unit 205. At this time, because variation does not increase if an additional capture is performed without changing the shape of the packaging member, the packaging member is spread out again and recaptured.

(Step S223)

In step S223, the image determination unit 205 determines from the image of the packaging member sent from the image capturing apparatus 1 whether or not there is sufficient variation within images of the packaging member.

In a case where the image of the packaging member is newly sent from the image capturing apparatus 1, images of the packaging member sent in the past are also included, and it is confirmed whether or not an image similar to the image of the extraction region 43 of a certain position also exists within an extraction region of another position. For example, a sum of absolute differences (SAD) for luminance differences between extraction regions may be obtained, extraction regions may be treated as similar to each other if the SAD is within a certain threshold. Because in a case where there is not a combination of similar extraction regions, the extraction regions are isolated patterns of appearances, it can be considered that there is still variation similar to those extraction regions. Accordingly, display control for displaying information indicating that an additional capture of the packaging member is necessary is performed on the display apparatus 3 to convey this to the user, and a request for additional capture to the image capturing apparatus 1 is made.

Conversely, in a case where there is no isolated pattern of appearances, it can be considered that all possible patterns of appearances have been obtained without exception. Accordingly, information indicating that images of sufficient variation for recognition have been obtained is displayed on the display apparatus 3 and is thereby conveyed to the user. With such a configuration, the user can easily determine whether there are enough images. Also, images of the target object and images of the packaging member obtained previously are sent to the image generation unit 201.

(Step S224)

In step S224, the image generation unit 201 generates reproduced images of the packaged object based on the image of the packaging member and each of the images of the target object sent from the image determination unit 205. Although in general reproduced images are generated similarly to step S123 of the first embodiment, their generation differs in that, because there are a plurality of packaging member images, a position of the extraction region 43 among the plurality of packaging member images is randomly selected. The generated reproduced images are sent to the image storage unit 102.

As described above, by virtue of the present embodiment, it is possible to determine whether or not there is sufficient variation within images of a packaging member for recognition, and by feeding this back to the user, it is possible to recognize a packaged object while further reducing the effort for capturing an image of the packaging member.

[Variation of Second Embodiment]

Although an SAD is used as an indicator for determining whether or not an extraction region is similar in step S223, limitation to this is not required. Any indicator that represents a degree of similarity such as an SSD (Sum of Squared Differences), an NCC (Normalized Cross-Correlation), or a ZNCC (Zero-mean Normalized Cross-Correlation) may be used.

Also, although in the second embodiment the image determination unit 205 is provided, and it is determined whether images of a sufficient variation for recognition have been obtained, it is not necessary to limit to this. Additionally, test data may be prepared by capturing a plurality of images of the packaged object and it may be decided whether or not an additional capture should be performed in accordance with a recognition rate of the test data. Firstly, a reproduced image is generated from an image of the target object and an image of the packaging member already captured, and a CNN model is learned. Then, the learned CNN model is used and test data recognition is performed to obtain a recognition success rate. Configuration may be taken to indicate the recognition rate to the user and allow the user to decide whether or not an additional capture is performed, and configuration may be taken so as to perform additional captures until a predetermined recognition rate is reached.

(Third Embodiment)

An information processing apparatus described in a third embodiment is an object recognition apparatus for recognizing an object by learning, by using a CNN model, a feature or a pattern from generated reproduced images, similarly to the first embodiment. However, the third embodiment differs in that an image selection unit by which a user adjusts a parameter for generating a reproduced image and decides whether or not to use a generated reproduced image for learning is further included. It is possible to recognize with better accuracy a packaged object at a lower cost by learning after a user generates and selects an appropriate reproduced image.

[Apparatus Configuration]

Figure 6:
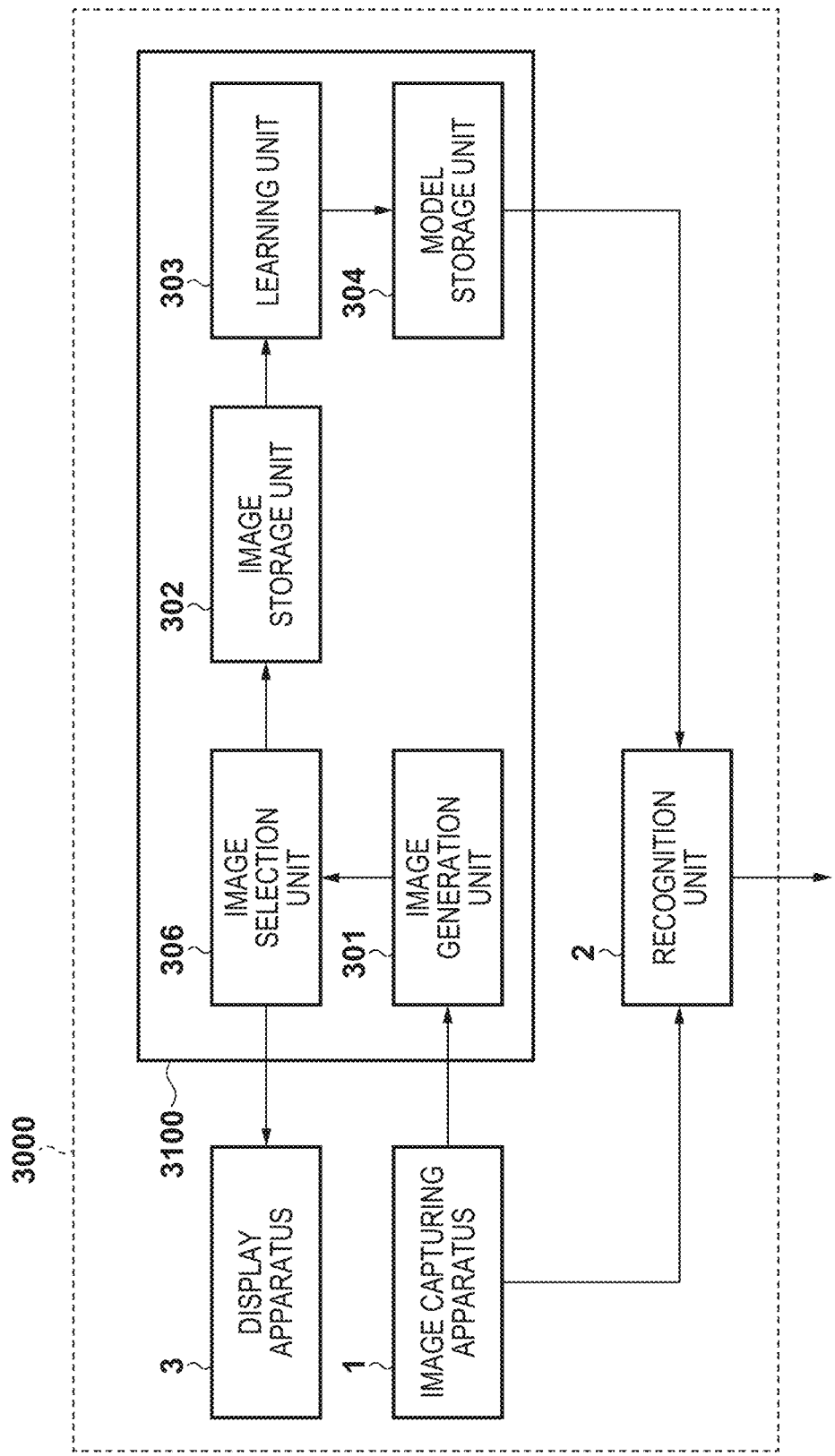
FIG. 6 is a block diagram illustrating an example of a configuration of an information processing apparatus of a third embodiment.

An example of an object recognition apparatus 3000 equipped with an information processing apparatus 3100 of the third embodiment is illustrated by the block diagram of FIG. 6. The object recognition apparatus 3000 is equipped with the image capturing apparatus 1, the recognition unit 2, the display apparatus 3, and the information processing apparatus 3100. Note, because the image capturing apparatus 1 and the recognition unit 2 are substantially the same as those in the first embodiment, description thereof is omitted. The display apparatus 3 displays a reproduced image sent from the information processing apparatus 3100 and displays a UI (user interface) for adjusting a parameter (such as α or t in Equation 1) in order to generate the reproduced image.

The information processing apparatus 3100 is equipped with an image generation unit 301, an image storage unit 302, a learning unit 303, a model storage unit 304, and an image selection unit 306. Note, because the image generation unit 301, the image storage unit 302, the learning unit 303, and the model storage unit 304 are substantially the same as the image generation unit 101, the image storage unit 102, the learning unit 103, and the model storage unit 104 of the first embodiment, description thereof is omitted.

The image selection unit 306 receives reproduced images that the image generation unit 301 generated and presents the reproduced images to the user via the display apparatus 3. Also, generation and display of the reproduced images are performed again in accordance with a parameter adjustment by the user. A reproduced image to be used for learning is ultimately selected by the user and sent to the image storage unit 302.

[Recognition Processing]

Because recognition processing by the object recognition apparatus 3000 of the third embodiment is substantially the same as the recognition processing of the first embodiment (FIG. 2A), description thereof is omitted.

Figure 7:
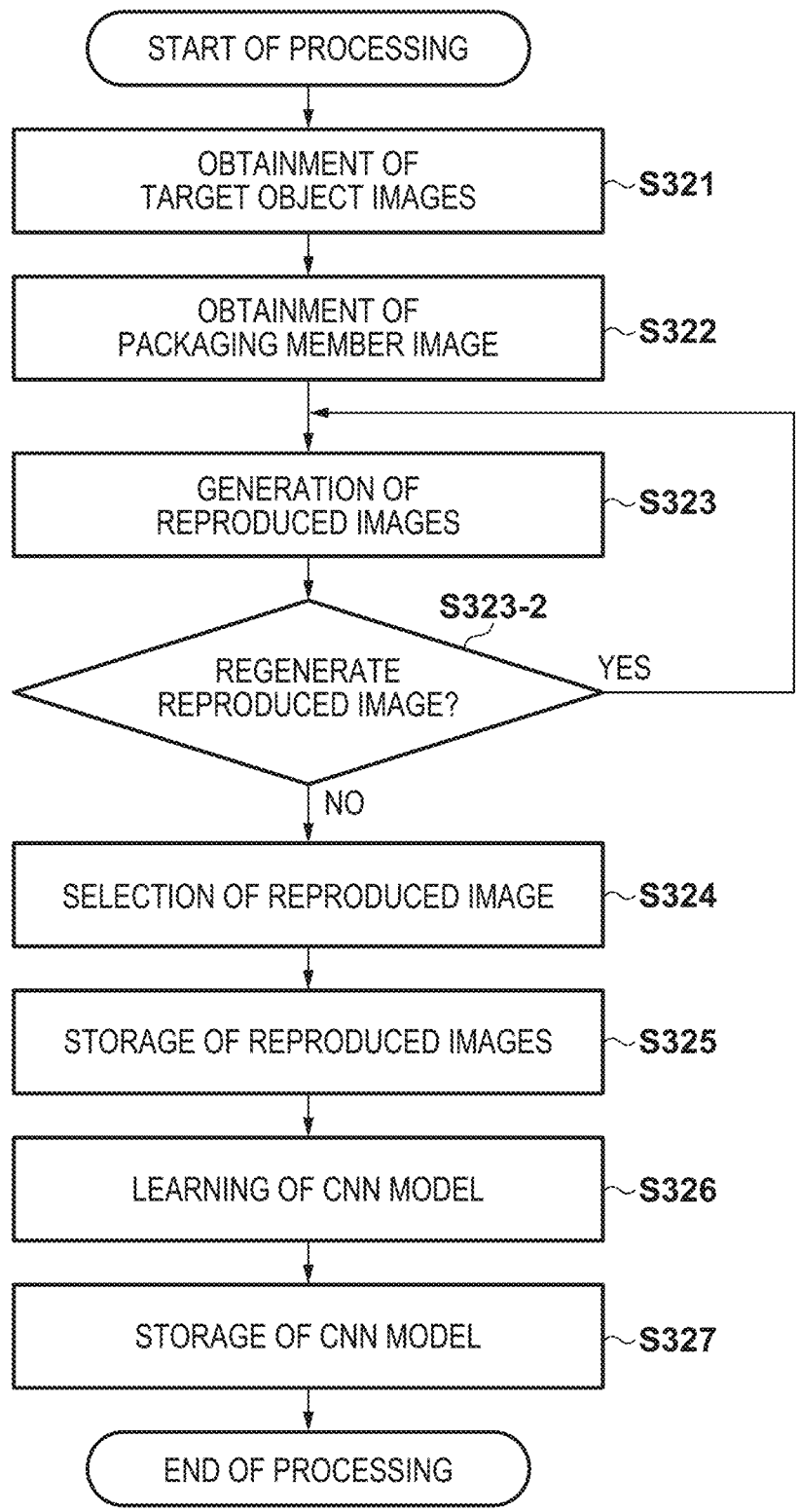
FIG. 7 is a flowchart for describing processing by the information processing apparatus of the third embodiment.

Next, a procedure of learning processing by the information processing apparatus 3100 according to the third embodiment is described with reference to a flowchart of FIG. 7. Note, because step S321, step S322, step S323, step S325, step S326, and step S327 are substantially respectively the same as step S121, step S122, step S123, step S124, step S125, and step S126 of the first embodiment, description thereof is omitted.

(Step S323-2)

Figure 8:
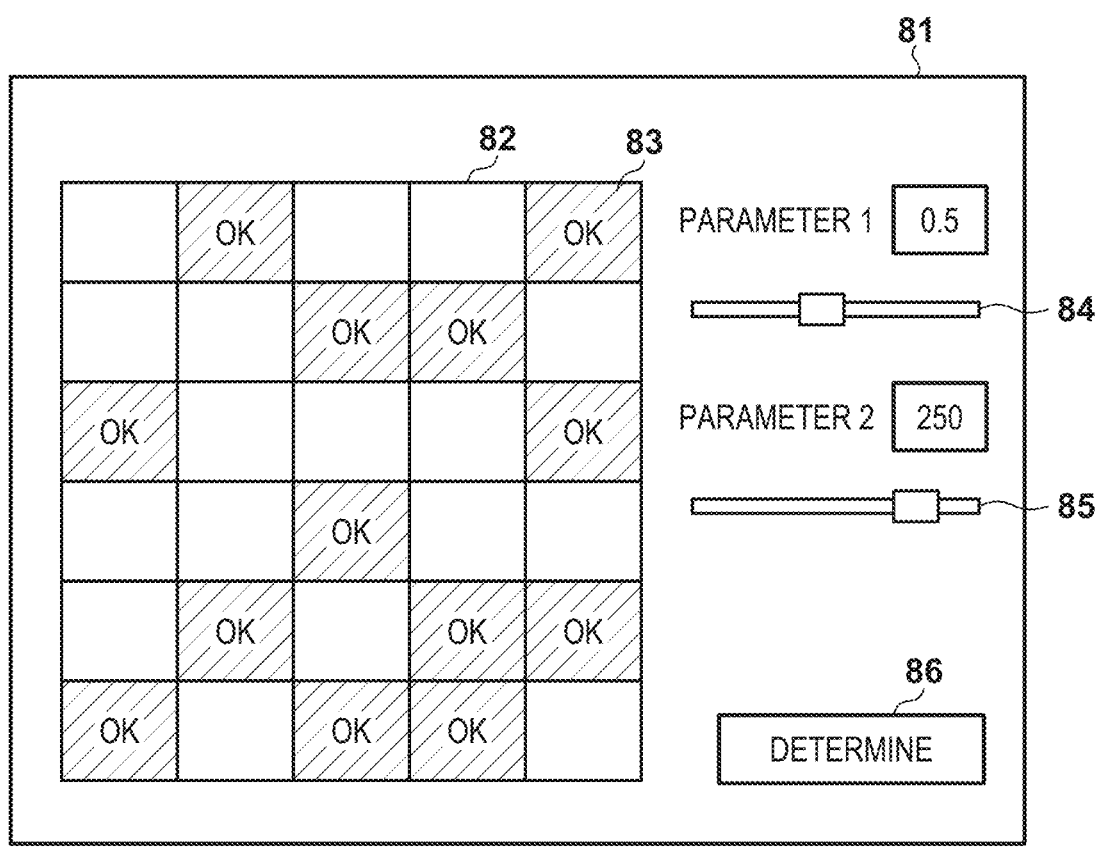
FIG. 8 is a view for describing a GUI that the information processing apparatus of the third embodiment illustrates.

In step S323-2, the image selection unit 306 presents the reproduced images sent from the image generation unit 301 to the user. Then, it is determined whether or not a reproduced image is to be regenerated in accordance with feedback from the user (user instruction). Hereinafter, processing of the image selection unit 306 is described using FIG. 8. In FIG. 8, reference numeral 81 represents a screen presented to the user, reference numeral 82 represents a display region in which reproduced images are lined up and displayed, reference numeral 83 represents a reproduced image selected for use in learning, reference numerals 84 and 85 represent UIs for adjusting parameters, and reference numeral 86 represents a decide button pressed when adjustment and selection of reproduced images has ended. Operation of a slide bar for a parameter adjustment or operation for selecting a button or the like is performed by a UI device (a mouse for example) (not shown).

Firstly, the user, by changing the UI 84 or the UI 85 while viewing the reproduced images displayed on the display region 82, performs adjustments to parameters so that reproduced images closer to the actual appearance of a packaged object can be obtained. Specifically, the parameters to be adjusted here are a and t in Equation 1. Step S323 is returned to and the image generation unit 301 is caused to generate the reproduced images, and the reproduced images are displayed again on the display region 82 in accordance with a change of the parameters.

(Step S324)

In step S324, the image selection unit 306 selects the reproduced images 83 to be used in learning from the display region 82 in accordance with an instruction of the user. Although over-learning or a failure to learn result when only similar images are learned or images that differ greatly in actual appearance are used to learn, it is possible to suppress such occurrences by selection of appropriate images by the user. When the user presses the decide button 86 and all selection is ended, the selected reproduced images are sent to the image storage unit 302.

As described above, by virtue of the present embodiment, learning is performed by using reproduced images that are close in appearance to an actual packaged object by the user adjusting the appearance of the reproduced images and selecting reproduced images to be used for learning. Accordingly, it is possible to recognize a packaged object with a higher accuracy at a lower cost.

(Fourth Embodiment)

An information processing apparatus described in the fourth embodiment is an object recognition apparatus for recognizing an object by learning, by using a CNN model, a feature or a pattern from a generated reproduced image, similarly to the first embodiment. However, the fourth embodiment differs in that a reproduced image is generated by considering a shape of the target object. By generating and learning a reproduced image that is closer to the actual appearance by considering the shape of the target object, it is possible to recognize with better accuracy a packaged object at a lower cost.

[Apparatus Configuration]

Figure 9:
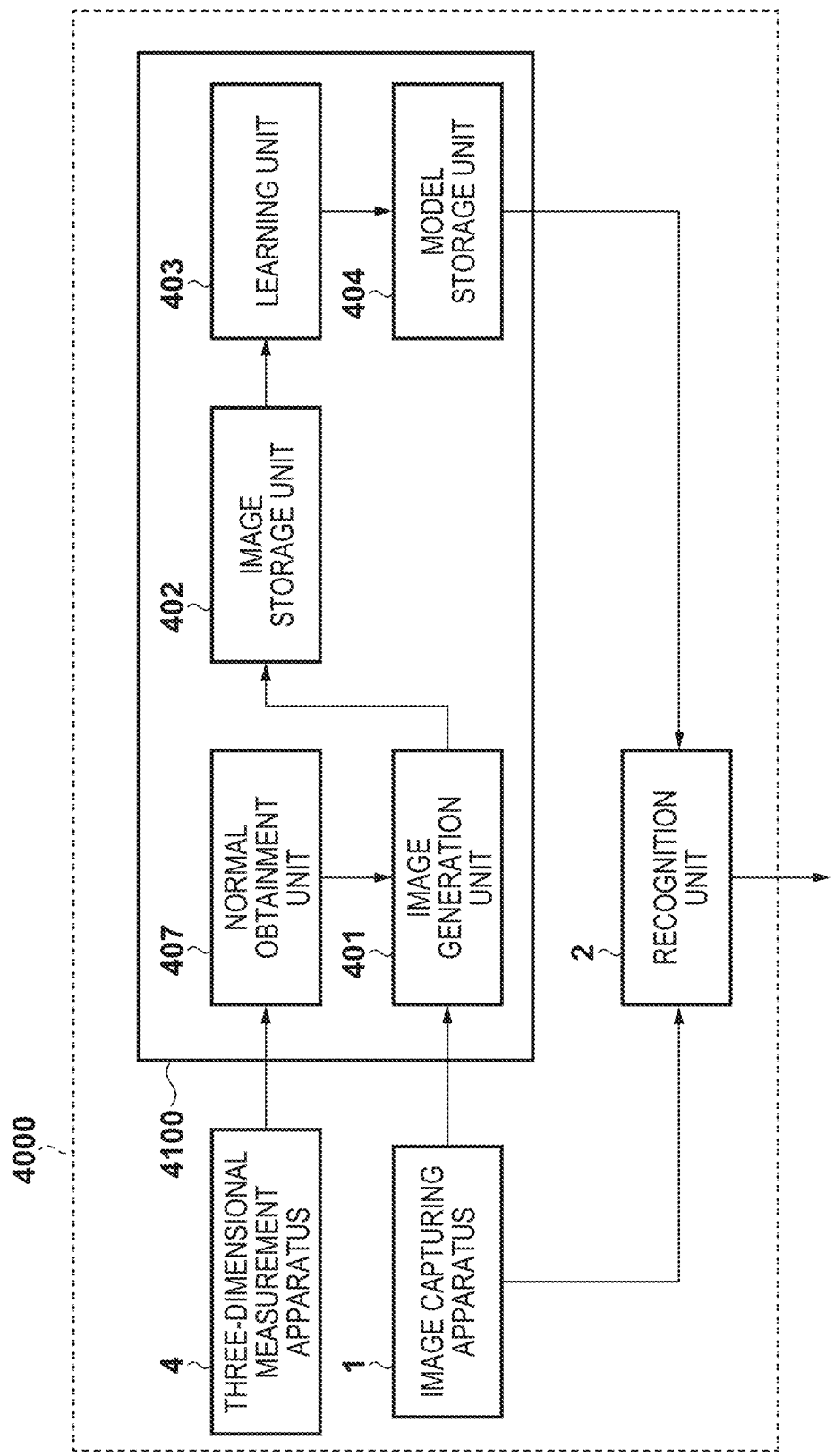
FIG. 9 is a block diagram illustrating an example of a configuration of an information processing apparatus of the fourth embodiment.

An example of an object recognition apparatus 4000 equipped with an information processing apparatus 4100 of the fourth embodiment is illustrated by the block diagram of FIG. 9. The object recognition apparatus 4000 is equipped with the image capturing apparatus 1, the recognition unit 2, a three-dimensional measurement apparatus 4, and the information processing apparatus 4100. Note, because the image capturing apparatus 1 and the recognition unit 2 are substantially the same as those in the first embodiment, description thereof is omitted.

The three-dimensional measurement apparatus 4 is an apparatus for obtaining a depth image. A calibration between the three-dimensional measurement apparatus 4 and the image capturing apparatus 1 is performed in advance, and a color image captured by the image capturing apparatus 1 and a depth image obtained by the three-dimensional measurement apparatus 4 are already aligned. In other words, a certain pixel (x, y) of the color image and the same pixel (x, y) of the depth image indicate the same object. The obtained depth image is sent to the information processing apparatus 4100.

The information processing apparatus 4100 is equipped with an image generation unit 401, an image storage unit 402, a learning unit 403, a model storage unit 404, and a normal obtainment unit 407. Note, because the image storage unit 402, the learning unit 403, and the model storage unit 404 are substantially the same as the image storage unit 102, the learning unit 103, and the model storage unit 104 of the first embodiment, description thereof is omitted.

The image generation unit 401 uses images of the target object and an image of the packaging member sent from the image capturing apparatus 1 and normal information sent from the normal obtainment unit 407 to generate a reproduced image of the packaged object. Then, it sends the generated reproduced image to the image storage unit 402.

The normal obtainment unit 407 calculates and obtains normal information for each pixel from the depth image of the target object sent from the three-dimensional measurement apparatus 4, and sends it to the image generation unit 401.

[Recognition Processing]

Because recognition processing by the object recognition apparatus 4000 of the fourth embodiment is substantially the same as the recognition processing of the first embodiment (FIG. 2A), description thereof is omitted.

Figure 10:
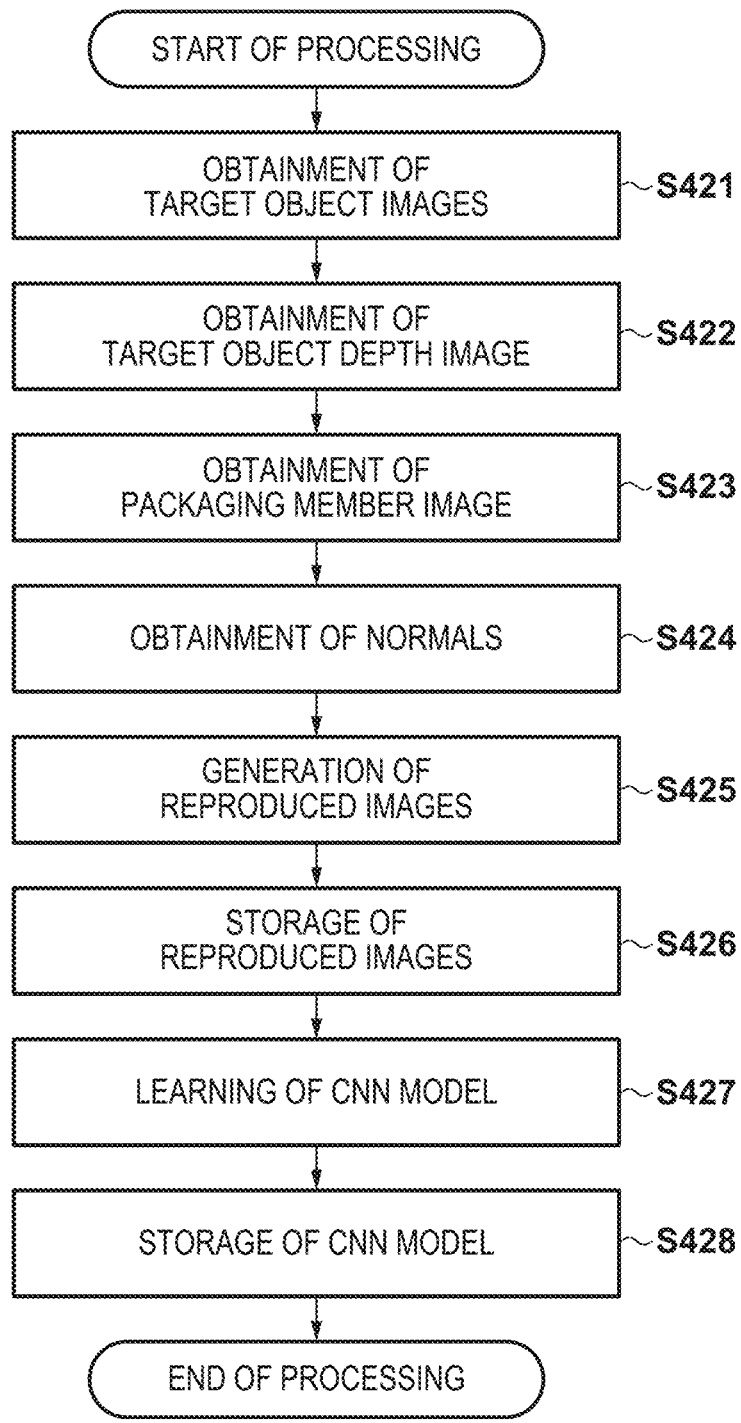
FIG. 10 is a flowchart for describing processing by the information processing apparatus of the fourth embodiment.

Next, a procedure of learning processing by the information processing apparatus 4100 according to a fourth embodiment is described with reference to a flowchart of FIG. 10. Note, because step S421, step S426, step S427, and step S428 are substantially the same as each of step S121, step S124, step S125, and step S126 of the first embodiment, description thereof is omitted.

(Step S422)

In step S422, the information processing apparatus 4100 obtains a depth image of the target object obtained by the three-dimensional measurement apparatus 4. Prior to this, the three-dimensional measurement apparatus 4 obtains the depth image of the target object from the same image capture position as in step S421. Then, the obtained depth image is sent to the normal obtainment unit 407.

(Step S423)

In step S423, the information processing apparatus 4100 obtains an image of the packaging member captured by the image capturing apparatus 1. Prior to this, the image capturing apparatus 1 captures the image of the packaging member. At this time, because the appearance (hereinafter represented by (r, g, b)) of the packaging member of each normal direction (hereinafter represented by (nx, ny, nz)) is obtained, capturing is performed such that the packaging member spread out into a spherical shape appears at the center. The appearances of the packaging member corresponding to each normal (a list in which (r, g, b)s corresponding to (nx, ny, nz)s are arrayed) is obtained by capturing such images. The captured images are sent to the image generation unit 401.

(Step S424)

In step S424, the normal obtainment unit 407 calculates and obtains normals (nx, ny, nz) for each pixel (hereinafter, a pixel position is represented by (x, y)) from the depth image of the target object sent from the three-dimensional measurement apparatus 4. For the normal obtainment, depth values in the vicinity of each pixel may be converted to a three-dimensional point group and principal component analysis may be performed on the three-dimensional point group for example. A normal for each pixel (a list in which (nx, ny, nz)s corresponding to (x, y)s are arrayed) obtained in this way is sent to the image generation unit 401.

(Step S425)

In step S425, the image generation unit 401 uses images of the target object and an image of the packaging member sent from the image capturing apparatus 1 and normal information sent from the normal obtainment unit 407 to generate a reproduced image of the packaged object. For each pixel (x, y) of the image of the target object, in accordance with the normal information ((nx, ny, nz) corresponding to (x, y)), the corresponding appearance of the packaging member (the (r, g, b) corresponding to (nx, ny, nz)) is obtained and is superimposed in accordance with Equation 1. At this time, a plurality of patterns of reproduced images are generated by adding Gaussian noise to the normal of each pixel ((nx, ny, nz) corresponding to (x, y)) because it can be considered that, for actual packaged objects, normal directions will vary due to shape distortions of the packaging member. The generated reproduced images are sent to the image storage unit 402.

As described above, by virtue of the present embodiment, learning is performed by using reproduced images that are close to the actual appearance by generating reproduced images considering the shape of the target object. Accordingly, it is possible to recognize a packaged object with a higher accuracy at a lower cost.

(Fifth Embodiment)

An information processing apparatus described in the fifth embodiment is an object recognition apparatus for recognizing an object by learning, by a CNN model, a feature or a pattern from a generated reproduced image, similarly to the first embodiment. However, the fifth embodiment differs in that, in addition to the appearance of the packaged object, the shape of the packaged object is reproduced from a depth image of a target object and a depth image of the packaging member, and the reproduced shape is also included to learn a feature or pattern. It is possible to recognize with better accuracy a packaged object at a lower cost by also learning a feature or pattern of the shape in addition to the appearance of the object.

[Apparatus Configuration]

Figure 11:
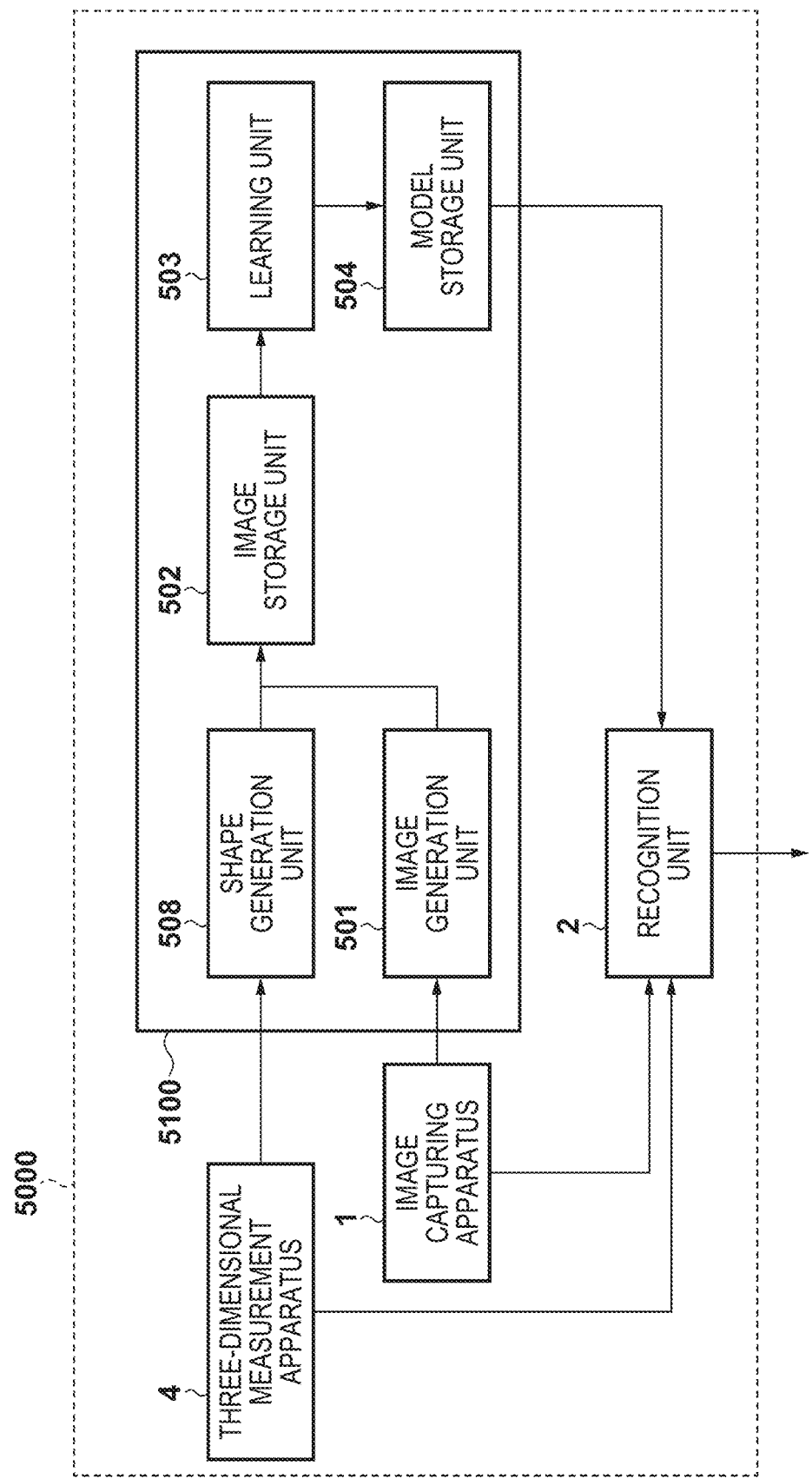
FIG. 11 is a block diagram illustrating an example of a configuration of an information processing apparatus of a fifth embodiment.

An example of an object recognition apparatus 5000 equipped with an information processing apparatus 5100 of the fifth embodiment is illustrated by the block diagram of FIG. 11. Note, because the object recognition apparatus 5000 is substantially the same as those in the fourth embodiment, description thereof is omitted.

The information processing apparatus 5100 is equipped with an image generation unit 501, an image storage unit 502, a learning unit 503, a model storage unit 504, and a shape information generation unit 508. Note, because the image generation unit 501 and the model storage unit 504 are substantially the same as the image generation unit 101 and the model storage unit 104 of the first embodiment, description thereof is omitted.

The image storage unit 502 stores the reproduced images sent from the image generation unit 501 and reproduced shapes sent from the shape information generation unit 508. The learning unit 503 creates and learns a CNN model by using the reproduced images and the reproduced shapes stored in the image storage unit 502. Then, it sends the learned CNN model to the model storage unit 504.

The shape information generation unit 508 receives a depth image of the target object and a depth image of the packaging member sent from the three-dimensional measurement apparatus 4 and generates a reproduced shape of the packaged object from these images. The generated reproduced shape is sent to the image storage unit 502.

[Recognition Processing]

Figure 12A:
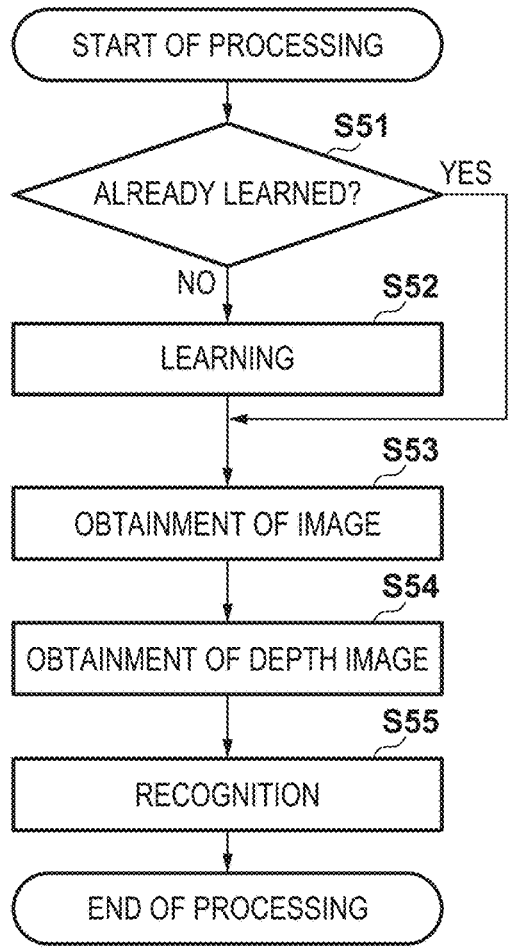
FIG. 12A-FIG. 12B are flowcharts for describing processing by the information processing apparatus of the fifth embodiment.

Next, a procedure of recognition processing by the object recognition apparatus 5000 according to a fifth embodiment is described with reference to a flowchart of FIG. 12A. Note, because step S51, step S52, and step S53 are substantially the same as step S11, step S12, and step S13 of the first embodiment, description thereof is omitted.

(Step S54)

In step S54, the three-dimensional measurement apparatus 4 obtains a depth image in which a target object or the like appears, and sends the image to the recognition unit 2.

(Step S55)

In step S55, the recognition unit 2 inputs the image sent from the image capturing apparatus 1 and the depth image sent from the three-dimensional measurement apparatus 4, and obtains a binary value indicating whether or not the target object appears within the image by performing an arithmetic operation of an already learned CNN model. Then, it is decided whether or not the target object appears within the image according to the obtained binary value. Then, a recognition result is outputted and the processing ends.

[Learning Processing]

Figure 12B:
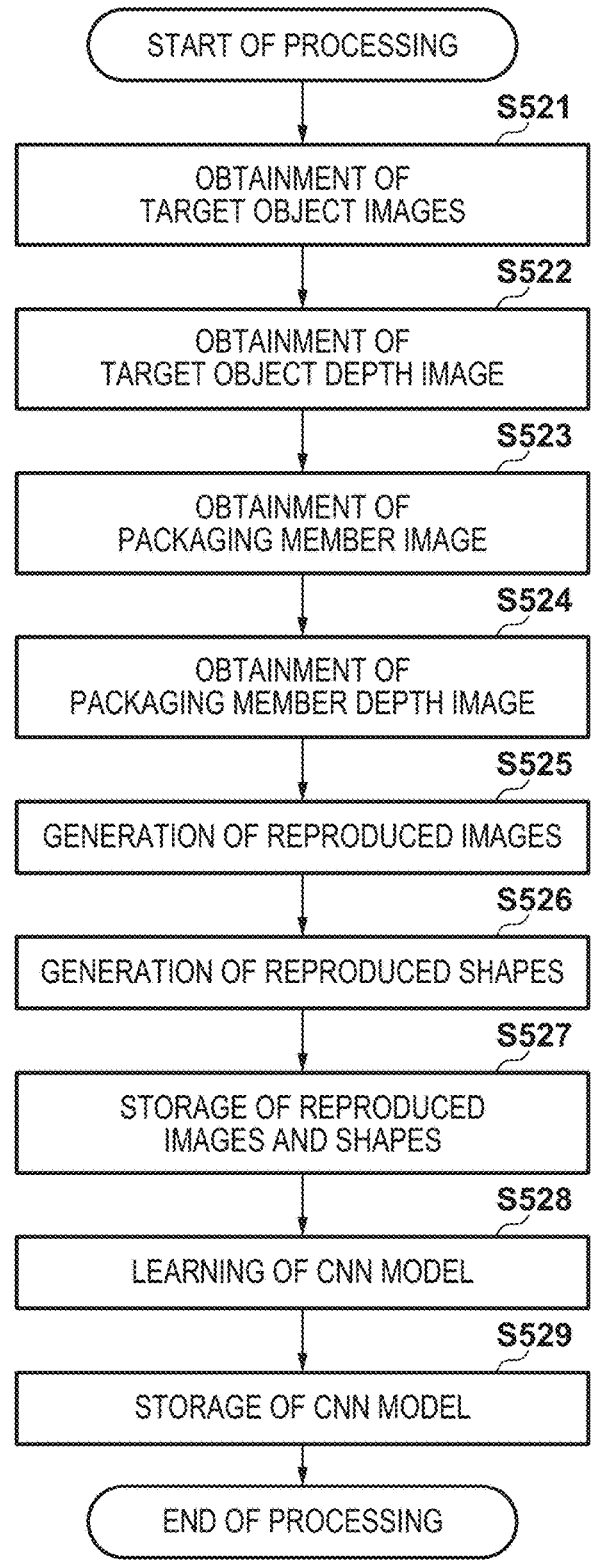

Next, a procedure of learning processing by the information processing apparatus 5100 according to a fifth embodiment is described with reference to a flowchart of FIG. 12B. Note, step S521, step S523, step S525, and step S529 are substantially respectively the same as step S121, step S122, step S123, and step S126 of the first embodiment. Description thereof is omitted.

(Step S522)

In step S522, the information processing apparatus 1100 obtains a depth image of the target object captured by the three-dimensional measurement apparatus 4. Prior to this, the three-dimensional measurement apparatus 4 obtains the depth image of the target object from the same image capture position as in step S521. Then, the obtained depth image is sent to the shape information generation unit 508.

(Step S524)

In step S524, the information processing apparatus 1100 obtains a depth image of the packaging member captured by the three-dimensional measurement apparatus 4. Prior to this, the three-dimensional measurement apparatus 4 obtains the depth image for the spread out packaging member from the same image capture position as in step S523. Then, the obtained depth image is sent to the shape information generation unit 508.

(Step S526)

In step S526, the shape information generation unit 508 based on the depth image of the target object and the depth image of the packaging member sent from the three-dimensional measurement apparatus 4, generates a reproduced shape of the target object wrapped in the packaging member. Similarly to the generation of the reproduced images of step S525, in relation to each depth image of the target object captured at various orientations, a depth image that is a part that is extracted from the depth image of the packaging member is superimposed to produce a reproduced shape.

Here, although the general flow is the same as in step S525, the composition equation is different. The depth image of the packaging member from which a part is extracted is represented by D, the depth image of the target object is represented by J, and the reproduced shape is represented by S, and the reproduced shape is generated by the following equation.

[EQUATION 4]

$$S(x,y)=D(x,y)+J(x,y) \qquad (4)$$

In other words, an amount of shape distortion simply due to being wrapped in the packaging member may be added. Then, the generated reproduced shapes are sent to the image storage unit 502.

(Step S527)

In step S527, the image storage unit 502 stores the reproduced images generated by the image generation unit 501 and the reproduced shapes generated by the shape information generation unit 508 within the memory.

(Step S528)

In step S528, the learning unit 503 creates and learns a CNN model by using the reproduced images and the reproduced shapes stored in the image storage unit 502. For a design of the CNN model, an RGBD four-dimensional image, in which the color (RGB) of a reproduced image and the depth (D) of a reproduced shape are combined are inputted, for example. Also, a design may be taken such that three convolution layers are used, two fully-connected layers are used, and the output is a model for discrimination of two classes corresponding to whether or not the input is a target object, for example. Because the following processing is the same as the processing of step S124 of the first embodiment, description thereof is omitted.

As described above, by virtue of the present embodiment, an object that is difficult to recognize by appearance only can also be recognized using shape information by reproducing the shape in addition to the appearance of the packaged object to learn a CNN model. Accordingly, it is possible to recognize a packaged object with a higher accuracy at a lower cost.

[Variation of Fifth Embodiment]

Although the reproduced shapes are generated based on Equation 4 in step S526, a composition method is not limited to this. Additionally, configuration may be such that a depth image B of a background, against which the target object or the packaging member is placed, is captured, and a reproduced shape is represented as in Equation 5, and configuration may be such that a thickness of the packaging member is measured in advance and the depth image is caused to expand by the thickness amount.

[EQUATION 5]

$$S(x,y)=D(x,y)+P(x,y)-B(x,y) \qquad (5)$$

In a case where the reproduced image is generated by CG rendering as is illustrated in the variation of the first embodiment, depth values obtained from rendering result may be made to be the reproduced shape.

Although a CNN model is learned by using both a reproduced image and a reproduced shape in the fifth embodiment, the CNN model may be learned by using only the reproduced shape.

[First Variation]

Although in all embodiments, an apparatus for obtaining an RGB color image is used as the image capturing apparatus 1, it is not necessary to be limited to this. It may be an apparatus for obtaining a monochrome image or may be an apparatus for obtaining an infrared light image.

[Second Variation]

Although in all of the embodiments an image of the target object or the packaging member is captured by the apparatus itself, it is not necessary to be limited to this. A published image database for research may be used or images uploaded on the Web may be used.

[Third Variation]

Although the extraction region 43 uses the shape of a square in every embodiment, it is not necessary to be limited to this. It may be circular or may conform to the external form of the target object.

[Fourth Variation]

Although in all of the embodiments, learning of a CNN model is performed after reproduced images or reproduced shapes are stored in the memory of the image storage unit 502, it is not necessary to be limited to this. The learning may be performed while generating the reproduced images or the reproduced shapes by inputting the generated shapes into the CNN model.

[Fifth Variation]

Although, in all of the embodiments, the design of the CNN model is such that there are three convolution layers and two fully-connected layers, it is not necessary to be limited to this. There can be any number of overlapping convolution layers and fully-connected layers and the design may be changed according to a purpose of recognition.

[Sixth Variation]

Although, in all of the embodiments, it is recognized whether or not a target object appears within an image, it is not necessary to be limited to this. The position of the target object may be detected during a sliding window within the image by recognizing whether or not the target object appears within each window. Also, an output of a CNN model need not be a binary value indicating whether or not the target object appears, and an orientation of the target object may also be recognized by increasing the output so as to perform a classification of orientations also. For example, the output may be made to be nine values: eight orientation classifications and a value indicating that the image is not the target object. At this time, configuration may be such that the labeling of learning data is not the binary values of True and False, but rather is a number of labels proportional to the number of orientations to be recognized.

[Seventh Variation]

Although, in all of the embodiments, a CNN which is a type of deep learning network is learned and a recognition device is configured, but it is not necessary to be limited to this. An LBP (Local Binary Pattern) may be used or a BoF (Bag of Features) or the like may be used as a feature. Also, a decision tree may be used, or an SVM (Support Vector Machine) or the like may be used as a discrimination unit.

<Effects of the Embodiments>

By virtue of the first embodiment, reproduced images of a packaged object can be generated from images of a target object and an image of a packaging member, and by learning a CNN model from the reproduced images, a packaged object can be recognized without requiring the effort of capturing a large number of images of packaged objects.

By virtue of the second embodiment, it is possible to determine whether or not there is sufficient variation within images of a packaging member for recognition, and by feedback to the user, it is possible to recognize a packaged object while further reducing the effort for capturing an image of the packaging member.

By virtue of the third embodiment, learning is performed by using reproduced images that are close in appearance to an actual packaged object by the user adjusting the appearance of the reproduced images and selecting reproduced images to be used for learning. Accordingly, it is possible to recognize a packaged object with a higher accuracy at a lower cost.

By virtue of the fourth embodiment, by generating reproduced images by considering the shape of the target object, learning is performed by using reproduced images closer to the actual appearance. Accordingly, it is possible to recognize a packaged object with a higher accuracy at a lower cost.

By virtue of the fifth embodiment, an object that is difficult to recognize by appearance alone can be recognized using shape information by reproducing the shape in addition to the appearance of the packaged object to learn a CNN model. Accordingly, it is possible to recognize a packaged object with a higher accuracy at a lower cost.

<Definitions>

It is not necessary that the entire packaging member in the present invention be transparent, and it is sufficient if a part thereof is transparent. A part may also be opaque due to a bar code sticker being affixed to a transparent vinyl, and the packaging member may be transparent only on a window portion as with an envelope with a window. Also, transparency (approximately how transparent it is) of a transparent portion is not limited, and the packaging member may also have color.

Also, although an example in which a target object is covered in a packaging member is illustrated in each of the embodiments, there is no limitation to a case in which a target object is completely covered in a packaging member, and there may be cases in which a part of the target object is covered by a packaging member for example. In such a case, the extraction region 43 extracted from the image 42 of the packaging member may be extracted as a region smaller than the target object, and a reproduced image may be generated by superimposing this extraction region 43 on the position of the target object that the packaging member covers.

The image generation unit in the present invention may use any composition method if images similar to the actual appearance of a packaged object can be generated, as described in the first embodiment. It may be an addition by alpha blending and may also be a multiplication. Also, a reproduced image may be generated by CG rendering. Furthermore, a reproduced image may be generated from the appearance of a packaging member for each normal direction, as described in the fourth embodiment.

The image determination unit in the present invention may use any indicator if a degree of similarity between clipped images can be represented, as described in the second embodiment. It may be an SAD or may be an SSD. Also, test data may be prepared in advance, and a necessity of additional images may be determined by a recognition rate of the test data.

The shape information generation unit in the present invention may use any composition method if shapes similar to the actual shape of a packaged object can be generated, as described in the fifth embodiment. Configuration may be taken to add depth images of the target object and the packaging member to expand the shape of the target object in proportion to the thickness of the packaging member. Also, a reproduced shape may be generated by CG rendering.

By virtue of the present invention, it is possible to reduce the effort for obtaining images (learning data) of an object covered by another object that is transparent.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-181937, filed Sep. 16, 2016, which is hereby incorporated by reference wherein in its entirety.

What is claimed is:

1. An information processing apparatus comprising:
   an image generation unit configured to composite a first image including a captured transparent object having transparency and a second image including a captured target object, and generate a reproduced image, where the target object at least partially covered by the transparent object, is reproduced; and
   a creation unit configured to create, by machine learning of features of the reproduced image, a model for recognizing the target object at least partially covered by the transparent object.

2. The information processing apparatus according to claim 1, wherein the image generation unit generates the reproduced image by, for a pixel whose luminance value in the first image is greater than or equal to a threshold, setting the luminance value of that pixel as a corresponding luminance value in the reproduced image.

3. The information processing apparatus according to claim 1, further comprising:
   a normal obtainment unit configured to obtain information of a normal direction of each pixel from a depth image and obtain a shape of the target object,
   wherein the image generation unit generates the reproduced image based on the first image, the second image, and the information of the normal direction.

4. The information processing apparatus according to claim 1, further comprising:
   an image determination unit configured to determine a multiformity of the first image based on the first image,
   wherein the image generation unit, in a case where the image determination unit determines that the multiformity is sufficient, generates the reproduced image based on the first image and the second image.

5. The information processing apparatus according to claim 4, further comprising:
   an obtainment unit configured to obtain the first image and the second image,
   wherein the obtainment unit, in a case where the image determination unit determines that the multiformity is insufficient, obtains a third image obtained by recapturing the transparent object.

6. The information processing apparatus according to claim 4, further comprising a display control unit configured to, in a case where the image determination unit determines that the multiformity is insufficient, cause a display apparatus to display information indicating that it is necessary to additionally capture the transparent object.

7. The information processing apparatus according to claim 1, further comprising an image selection unit configured to select, in accordance to an instruction of a user, a reproduced image, from among a plurality of reproduced images generated by the image generation unit, used for the creation of the model.

8. The information processing apparatus according to claim 1, further comprising an adjustment unit configured to adjust in accordance with an instruction of a user a parameter used for generation of the reproduced image.

9. The information processing apparatus according to claim 1, further comprising:
   a shape generation unit configured to generate, based on a depth image used to obtain a shape of the transparent object and a depth image used to obtain a shape of the target object, a reproduced shape of the target object covered at least partially covered by the transparent object,
   wherein the creation unit creates the model based on the reproduced image and the reproduced shape.

10. An object recognition apparatus comprising:
    an image generation unit configured to composite a first image including a captured transparent object having transparency and a second image including a captured target object, and generate a reproduced image, where the target object at least partially covered by the transparent object, is reproduced;
    a creation unit configured to create, by machine learning of features of the reproduced image, a model for recognizing the target object at least partially covered by the transparent object; and
    a recognition unit configured to recognize the target object based on the model.

11. A method of controlling an information processing apparatus, the method comprising:
    compositing a first image including a captured transparent object having transparency and a second image including a captured target object, and generate a reproduced image, where the target object at least partially covered by the transparent object, is reproduced; and creating, by machine learning of features of the reproduced image, a model for recognizing the target object at least partially covered by the transparent object.

12. A non-transitory computer-readable storage medium storing a computer program executable a computer to execute a method of controlling an information processing apparatus comprising the steps of:

compositing a first image including a captured transparent object having transparency and a second image including a captured target object, and generate a reproduced image, where the target object at least partially covered by the transparent object, is reproduced; and creating, by machine learning of features of the reproduced image, a model for recognizing the target object at least partially covered by the transparent object.

* * * * *